United States Patent [19]

Rohrmann et al.

[11] Patent Number: 5,467,420
[45] Date of Patent: Nov. 14, 1995

[54] COAXIAL HIGH FREQUENCY CABLE INCLUDING AN OPTICAL FIBER ELEMENT

[75] Inventors: Peter Rohrmann; Alexander Weiss; George Hög, all of Mönchengladbach; Peter Zamzow, Bochum, all of Germany

[73] Assignee: Kabel Rheydt Aktiengesellschaft, Monchengladbach, Germany

[21] Appl. No.: 225,146

[22] Filed: Apr. 8, 1994

[30] Foreign Application Priority Data

| Apr. 10, 1993 | [DE] | Germany | 43 11 915.8 |
| Apr. 10, 1993 | [DE] | Germany | 43 11 913.1 |
| Apr. 10, 1993 | [DE] | Germany | 43 11 912.3 |

[51] Int. Cl.⁶ .................................................. G02B 6/44
[52] U.S. Cl. ........................... 385/101; 385/75; 385/76
[58] Field of Search ................................. 385/101, 75, 76; 174/70 R

[56] References Cited

U.S. PATENT DOCUMENTS

| 4,460,419 | 7/1984 | Parfree et al. | 385/101 |
| 4,579,420 | 4/1986 | Winter et al. | 385/101 |
| 4,695,127 | 9/1987 | Ohlhaber et al. | 385/101 |
| 4,795,230 | 1/1989 | Garcia et al. | 385/76 |
| 4,896,939 | 1/1990 | O'Brien | 385/101 |

FOREIGN PATENT DOCUMENTS

| 0469343 | 7/1991 | European Pat. Off. . |
| 4106890 | 3/1991 | Germany . |
| 4121275 | 6/1991 | Germany . |
| 2160678 | 12/1985 | United Kingdom | 174/70 |

OTHER PUBLICATIONS

Cable connector brochure, 1990 (no month).

Primary Examiner—Rodney B. Bovernick
Assistant Examiner—Yisun Song
Attorney, Agent, or Firm—Ware, Fressola, Van Der Sluys & Adolphson

[57] ABSTRACT

A radiating high frequency cable with a tubular inner conductor and a concentric tubular outer conductor. The inner conductor and the outer conductor are spaced apart by an insulating material. The cable includes at least one optical fiber element within the inner conductor.

13 Claims, 2 Drawing Sheets

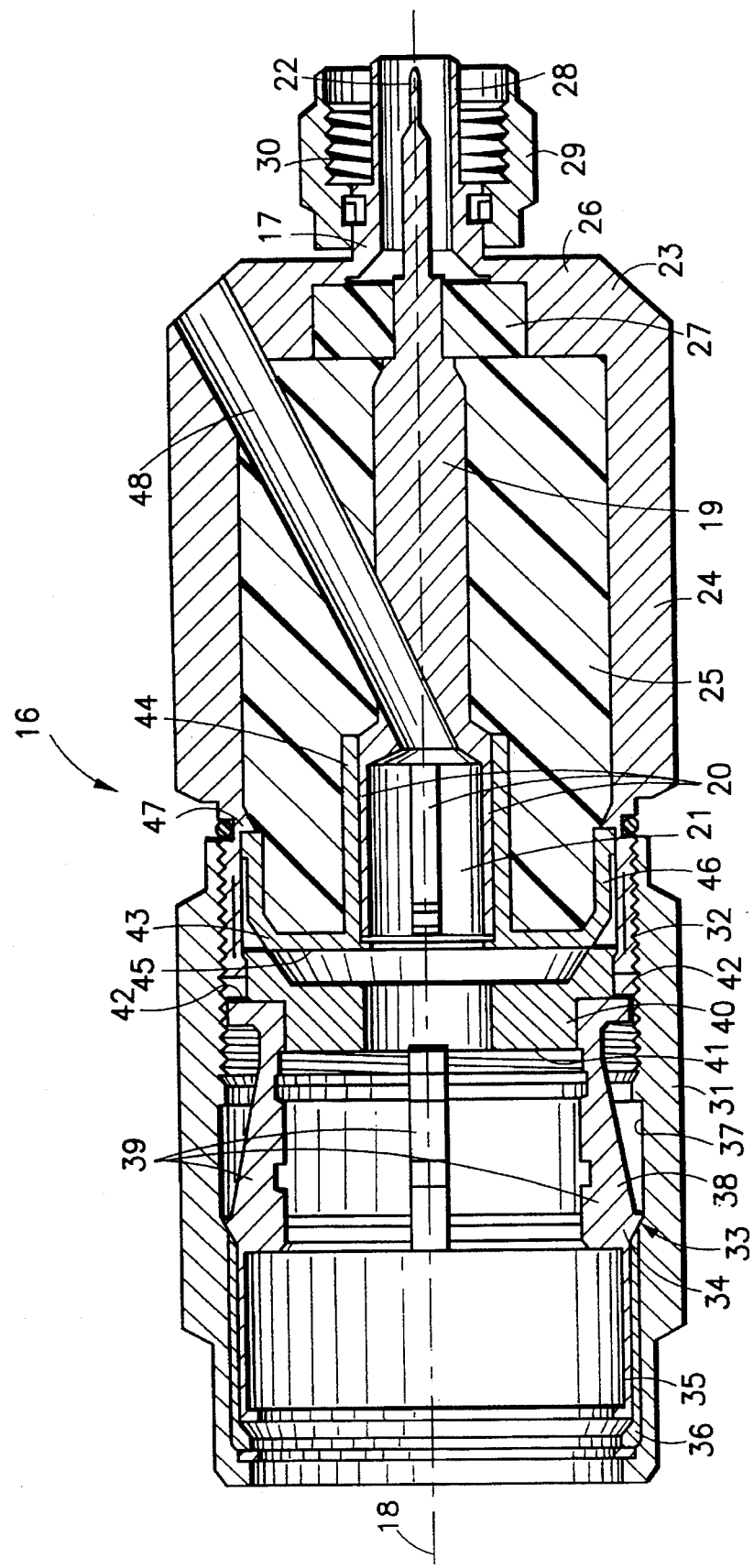

COAXIAL HIGH FREQUENCY CABLE INCLUDING AN OPTICAL FIBER ELEMENT

BACKGROUND OF THE INVENTION

The present invention generally relates to a coaxial high frequency cable and, in particular, relates to one such cable having a tubular metallic inner conductor and a tubular metallic outer conductor, the inner conductor and the outer conductor being fixed in their spatial position by a dielectric material.

In general, coaxial cables are well known in the art and are most often used for the transmission of high frequency signals. Typically, coaxial cables differ in the outer dimensions thereof and the dielectric material disposed between the inner and the outer conductors thereof. One factor in selecting the dielectric material is the power to be transmitted through the cable. However, a concentric arrangement and the energy transmission by electrical lines is common to all such cables. With the introduction of optical transmission elements, the connection of electrical transmission lines and optical transmission elements in parallel has been implemented. Such an arrangement has been implemented either to use the data transmitted via the optical transmission element for control purposes or to implement switching processes. Further, the optical transmission element can be used as a sensor to detect changes in the environment of the cable and to transfer the sensed signals to a central location for the purpose of controlling the operational status of the main cable, e.g. the operating temperature of an earth-bound high voltage cable.

Conventionally, for example, optical fibers are inserted in the interstices of the electrical power cables or, alternatively, one wire of the electrical braiding of the high voltage cable is replaced by an optical fiber. As a further alternative, particularly in the case of overhead transmission lines, an optical fiber is stranded with the single wires of the transmission line. This arrangement of light wave guide elements into the sandwich construction of electric cables provides the optical fiber with an excess length. As a result, stresses that occur during cable manufacturing and during cable installation do not result in fracture of the optical fiber.

However, typical high frequency coaxial cables differ from such electrical power lines even in their mechanical construction. Further, any steps or measures used in conjunction with the addition of an optical fiber must not be allowed to affect the electrical transmission characteristics of the coaxial high frequency cable.

Radiating high frequency cables, also called leading cables, are wave guides that typically include openings, for example, in the form of slits, disposed along the length of the outer conductor. The openings serve to radiate energy, introduced at one end of the cable, into the space surrounding the cable, where this energy is absorbed by appropriate aerial systems and the transmitted signals are evaluated. The output of the cable at the other end thus exhibits a decreased power intensity due to the natural attenuation of the cable and the continuous radiation therefrom. Frequently, such cables are mounted overhead in funnels, to provide the capability to passing traffic, such as trains or cars, to receive signals from the outside or, alternatively, to transmit signals from inside the tunnel to the outside. Many solutions are known to reduce the signal attenuation by varying the number, size, and arrangement of the slits.

However, in a typical tunnel, high frequency cables are not the only cables installed. For example, other data transmission lines are installed parallel thereto. Such data transmission lines may, for example, serve to control existing amplifier equipment. More recently, these data transmission lines are implemented by the use of optical fibers. However, the use of such optical fibers requires an additional cable installation. Further, each additional cable installation requires additional space, and in many instances, substantial added expense for mounting the cable where an attachment to the wall is not already available.

Consequently, the provision of a coaxial cable that overcomes the above-identified drawbacks of conventional cables is highly desirable.

SUMMARY OF THE INVENTION

Accordingly, one object of the present invention is to provide a coaxial high frequency cable having a parallel optical transmission line in an arrangement wherein the parallel optical transmission not only has no influence on the electrical transmission properties of the cable but ensures that the steps of assembling the connections on both ends may be readily and independently completed.

This object is accomplished, at least in part, by the provision of a coaxial cable having a tubular inner conductor including at least one optical fiber therewithin.

The present invention recognizes and makes use of the fact that an optical fiber disposed within the inner conductor of a coaxial cable is unaffected by the high frequency electrical transmission, reflections, etc. occurring through the inner and outer conductors. In addition, the present invention avoids the need for multiple laying of cables and can be readily and inexpensively assembled.

According to one aspect on the invention, one or more optical fibers, either alone or bundled, are placed loosely, i.e., with an excess length of more than about 0.5%, within the inner conductor of a coaxial cable. Further, an additional dielectric insulation may be provided about the optical fibers for mechanical protection. Such insulation can be implemented by use of conventional sealing mixtures that are fluid at least during the filling.

In one embodiment, the optical fibers may be employed for data transmission wherein the inner conductor of the high frequency cable acts as a metallic protection tube. Typically, the optical elements may be so called hollow, bundle, or solid core or ribbon cores, and if desired can be provided with tension absorbing elements.

In one particular arrangement, a coaxial radiating high frequency cable, is fabricated wherein the high frequency transmission and the optical transmission are combined such that the inner conductor of radiating high frequency cable is effectively replaced by an optical element. Thus, a tube consisting of steel, copper or aluminum wherein the optical fibers have an excess length of more than about 0.5% that the outer metal sleeve are used as the inner conductor.

The implementation of a high frequency coaxial cable with both an optical and an electrical transmission path in parallel has the further advantage that the optical fibers forming the optical wave guide element in the center of the cable are well protected by the metallic inner conductor. Further, because the optical wave guide element is centrally located, reliable connections for both the electrical and the optical transmission path are ensured. It will be understood that the inner conductor of the high frequency cable has a double function, that is, firstly, to protect the optical fibers as a metallic protection tube and secondly to provide for the transmission of electrical energy. Thus, it is expedient to select the metallic jacket robe for the optical guide element to the transmission requirements of the coaxial cable. By such a selection the transmission line characteristics of the high frequency coaxial cable meet the electrical operating requirements.

Because the optical fibers inside the central jacket tube, i.e., the inner conductor of the high frequency cable, have an excess length of more than 0.5%, the effective tensional stress does not affect the optical transmission characteristics. Contrary to well known techniques to achieve an excess length of optical fibers by stranding optical fibers in the electrical braiding of power cables, the placing of the optical fibers with an excess length of more than 5% central to the inner conductor does not result in any alteration of the optical transmission properties.

As already stated, the dimensions of the coaxial high frequency cable determine the frequency range and/or the transmission characteristics of such cables. Advantageously, by use of the present invention, parallel optical and electrical transmission paths down to the smallest dimensions can be fabricated. Thus, for example, the diameter of the jacket tube, which at the same time functions as the inner conductor of the coaxial high frequency cable, can be smaller than 2 millimeters and preferably less than 1 millimeter. Such minimized dimensions of the inner conductor, along with a correspondingly reduced outer conductor, can result in a further miniaturization of electrical/optical transmission paths and open up new fields of application.

The metallic jacket tube of the optical wave guide element, i.e., the inner conductor of the high frequency cable, may be a metallic pipe drawn down to the final dimensions. However, it is of particular advantage if the jacket robe is fabricated from a longitudinally seam welded strip of metal. Thus, in a reasonable manner any length of tube can be continuously produced. Further, this method also offers the possibility of ensuring the excess length of optical fibers desired inside the jacket tube. For example, the excess length may be ensured by controlling the feed speed of the metal strip and the optical fibers. In fact, it is possible, by feeding both the metal strip and the optical fiber at the same speed, to heat the metal strip before welding it along the edges thereof and to use the shortening that occurs during the cooling process to ensure an excess length of the optical fibers within the surrounding metallic jacket pipe.

In one preferred embodiment, the inner conductor of the coaxial high frequency cable, which is also the same jacket tube of a optical wave guide element, is a smooth tube. However, if required for example, to increase flexibility in addition to certain electrical and optical characteristics, the jacket tube may, regardless of the outer diameter thereof, be corrugated to achieve the necessary flexibility.

The high frequency coaxial cable with an integrated optical transmission path according to the present invention may be used for all purposes where conventional coaxial high frequency cables are currently being used. In fact, such a coaxial cable is particularly advantageous in applications where the outer conductor of the coaxial high frequency cable includes openings along the length of the cable to radiate electromagnetic energy. Such cables, also called high frequency radiation cables or leaking cables, are quite frequently used in tunnels to receive and transmit electrical signals from the passing traffic or to provide information from the outside to the traffic within the tunnel.

In many instances ready-to-use cables are preferred regardless of whether the preparation is done in the factory or at the installation site. For this purpose, so called plug-in connectors having a pin concentric to the longitudinal axis of the connector and being electrically connectable with the inner conductor of the cable are used. Typically, such a pin is, in the axial direction, partially surrounded by a radially extending socket. The socket is connected to a collet, which includes a tightening means to secure the plug-in connector to one end of the coaxial high frequency cable. Such plug-in connectors are commercially available, for example, such as those shown in the brochure "Cable Connectors" of Cable-Con A/S, Vordingborg, Denmark of Oct. 1, 1990.

In another aspect of the present invention a plug-in connector including a passageway is provided through which at least one optical wave guide element in the tubular inner conductor of the coaxial high frequency cable can be fed to the outside surface. Thus, the passageway extends from the pin to the outside at an oblique angle to the longitudinal axis of the plug-in connector.

Advantageously, such an arrangement ensures the relatively easy connection of a combined high frequency and optical cable with a lateral feed out of at least one optical wave guide element. Further, such an arrangement allows for the relatively easy manufacture of the plug-in connector. The plug-in connector can be easily mounted to an end of a combined coaxial high frequency and optical wave guide cable. Further, the transmission of high frequency signals is only negligibly affected by such a plug-in-connector. Consequently, the coupling of the ends of two cables is easily realized by common high frequency or optical wave guide connectors.

In one particularly simple embodiment of the present invention, wherein the plug-in connector has the least influence on the high frequency transmission, the passageway extends past the pin and the socket.

For the same reason it is advantageous, for the circular space between the pin and the socket to be filled with a dielectric material and for the passageway to extend through the dielectric material.

In order to minimize the influence of the feed out of the optical wave guide element on the high frequency transmission it is advantageous for the pin and the socket to be coated with plastic in the area of the passageway. Consequently, in such an embodiment, a metal tube containing the optical fibers fed through the passageway does not have direct contact to the metallic shell of the electrically conducting pin or socket.

Other objects and advantages will become apparent to those skilled in the art from the following detailed description read in conjunction with the appended claims and the drawings attached hereto.

BRIEF DESCRIPTION OF THE DRAWINGS

The drawing, not drawn to scale, include:

FIG. 3 which in a cross-sectional view of a connector embodying the principles of the present invention.

DETAILED DESCRIPTION OF THE INVENTION

Figure 1:
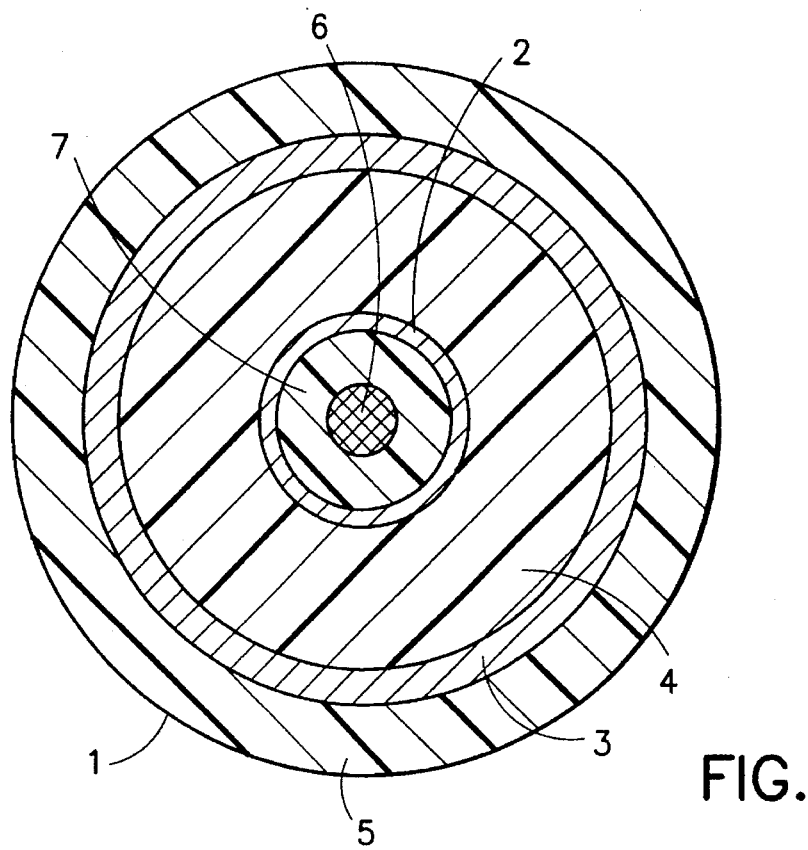
FIG. 1 which is a cross-sectional view of a coaxial high frequency cable embodying the principles of the present invention.

A high frequency coaxial cable, generally indicated at 1 in the drawings and embodying the principles of the present invention, includes a tubular inner conductor 2, a tubular outer conductor 3 concentric with the tubular inner conductor 2 and a dielectric 4 disposed therebetween. The dielectric 4 maintains the tubular inner conductor 2 and the tubular outer conductor 3 in position with respect to each other. The dielectric 4 can be, for example, plain plastic, foamed plastic or a disc-spacer construction or a combination thereof. The outer conductor 3 can be provided with an arrangement of slits for radiating electromagnetic waves into the space surrounding the cable 1. A surrounding outer jacket 5, made, for example, from a nonabrasive and, if desired, flame-resistant, plastic that protects the radiating high frequency cable 1 against external mechanical influences is provided.

In the embodiment shown, the inner conductor 2 contains a plurality of optical fibers in the form of a separate optical wave guide element 6. The optical wave guide element 6 enables simultaneous optical data transmission along with the electrical transmissions. The optical wave guide element 6 may be a hollow, bundle or solid core as well as a stack or a plurality of ribbons that include individual optical fibers, e.g. fixed by plastic film. The optical wave guide element 6 is, in this embodiment, enclosed by a sleeve 7 formed from, for example, polyethylene, which may also serve as a heat insulator during the fabrication of the radiating high frequency cable when the subsequent plastic layers are extruded. This heat insulation is particularly of benefit to the optical fibers contained in the inner conductor 2 to protect them from damage due to the high temperatures employed during fabrication. The length, thickness and material of the sleeve 7 is dependent upon the heat capacity of the dielectrics as well as the processing temperature of the plastics.

The ability to selectively design the dielectric 4 between the inner conductor 2 and the outer conductor 3 is a clear advantage of the cable 1. This advantage derives from the fact that the integration of the optical transmission path is totally independent from the other cable construction since it is only required that there be a coaxial arrangement of the inner conductor 2 and the outer conductor 3.

Figure 2:
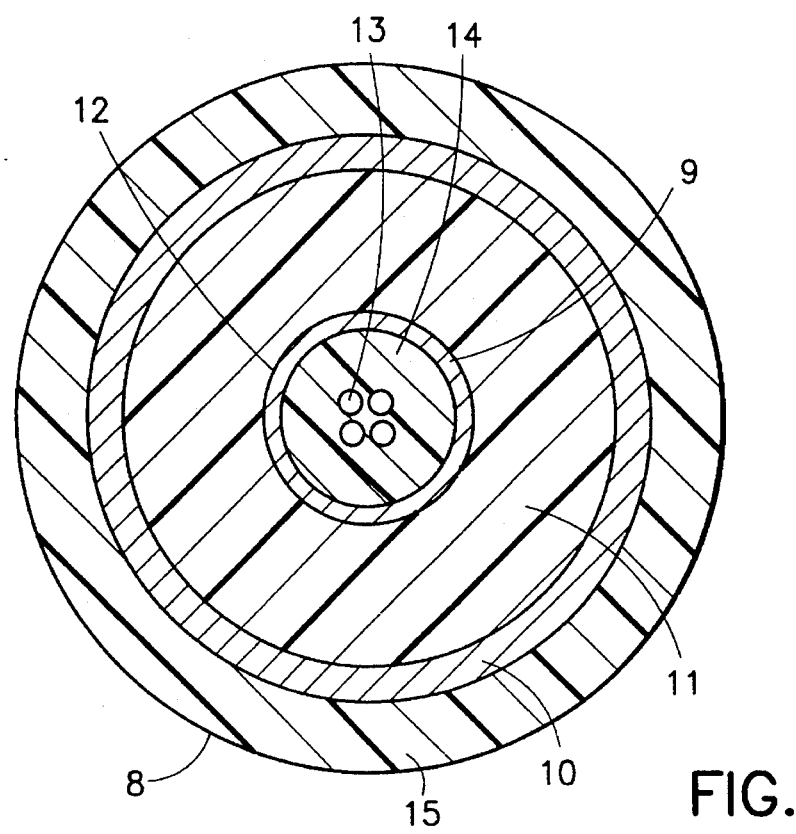
FIG. 2 which is a cross-sectional view of another coaxial high frequency cable also embodying the principles of the present invention.

In the embodiment shown in FIG. 2, the coaxial high frequency cable 8 also includes a tubular inner conductor 9 concentric with a tubular outer conductor 10. The inner conductor 9 and the outer conductor 10 are both tubular shaped and space apart by the dielectric 11. Thus, the inner conductor 9 and the outer conductor 10 are electrically insulated. In this particular embodiment, the dielectric 11 is formed, for example, of polyethylene foam which is extruded on the inner conductor 9. Alternatively, the dielectric 11 may be designed as a spiral spacer. Thus, the integration of the optical transmission path is totally independent from the remainder of the cable construction since it is only required that a coaxial arrangement of the inner conductor 9 and the outer conductor 10 be included.

The inner conductor 9 and the jacket tube of the optical wave guide element 12 are effectively the same. In this embodiment, the optical wave guide element 12 is formed by a bundle of optical fibers 13 loosely placed in the inner conductor (jacket tube) 9 with an excess length of more than 0.5%. In addition, the cable 8 includes a sealing material 14 of, for example, a polymeric material. For ease of fabrication, the polymeric material is preferably selected to be one that is fluid during the manufacture. The outer conductor 10, in the case where the cable 8 is used as a high frequency radiation cable, is fitted with a preselected slit and void arrangement. In such an arrangement, the outer conductor 10 is surrounded by an outer jacket 15 that provides mechanical protection and which may be selected to be unabrasive and/or flame resistant by selecting an appropriate material.

An exemplary plug-in connector 16 is shown in FIG. 3 and is used in the fabrication of a combined coaxial high-frequency and optical wave guide cable having a tubular inner conductor with at least one optical wave guide element placed therein. The plug-in connector 16 includes a pin 19 passing coaxially along a longitudinal axis 18 to the end 17 thereof. On the end of the plug-in connector distal the end 17, the pin 19 is connectable to the inner conductor of the combined coaxial high frequency and optical wave guide cable. For this purpose, the pin 19 on this end has, for example, four contact latches 20 extending in the direction distal to the end 17 and approximately surrounding the periphery thereof. In this embodiment, the tubular inner conductor of the coaxial cable to be contacted is insertable into, for example, a cylindrical joint 21 surrounded by the contact latches 20. Preferably, the coaxial cable is shouldered prior to the insertion thereof into the plug-in connector 16. The contact latches 20 may, for example, be pretightened in the radial direction so that they fit closely to the circumference of the tubular inner conductor to create a good electrical contact to the inner conductor. On the end 17 of the plug-in connector 16, the pin 19 has a pin-shaped first electrical contact element 22. Preferably, the first electrical contact element 22 is concentric with the longitudinal axis of the plug-in connector.

In the axial direction, the pin 19 is at least partially, but preferably, completely surrounded by a tubular socket 23. In one embodiment, the socket 23 is concentric to the longitudinal axis 18 of the plug-in connector 16 and extends a distance along the pin 19 in the radial direction. A radial circular space is formed between a cylindric partition 24 of the socket 23 distal the end 17 of the plug-in connector 16 and the circumference of the pin 19. The circular space so formed may be filled with a dielectric insulator 25. On its side proximate the contact element 22 of the pin 19, the socket 23 is provided with an intermediate partition 26 extending from the cylindrical partition 24 in the radial direction to the inside proximate the circumference of the pin 19. A circular, electrically insulating spacer 27 is disposed between the pin 19 and the intermediate partition 26 of the socket 23. Preferably, the spacer 27 fits close to the wall of the socket 23 as well as to the circumference of the pin 19. Thus, the spacer 27 acts to center the pin 19 and the socket 23. A circular second contact element 28 is attached to the intermediate partition 26 and is spaced apart from and parallel to the first contact dement 22 of the pin 19. The element 28 extends to the end 17 of the plug-in connector 16, for example, concentrically to the longitudinal axis 18 of the plug-in connector 16. A circular fastening dement 29 is securely attached to the contact dement 28 of the socket 23, for example, and includes an inside thread 30. The inside thread 30 serves to connect the plug-in connector 16 to a coupling or a connector socket on the housing of a device.

On its end distal to the second contact dement 28 the socket 23 is screwed onto the tubular collet 31 by means of the thread 32. A tightening means 33 with a tightening element 34 is placed inside the collet 31 to fix the plug-in connector 16 to the prepared combined coaxial high frequency and optical wave guide cable and to electrically contact the outer conductor. The tubular tightening means 34 has, on its side proximate to the socket 23, a contact area 38 with a reduced width and is wedged on a cylindrical partition 35 distal the socket 23 in a longitudinal boring 37 in the tubular collet 31 by means of a cylindrical wedging element 36. When a suitably stepped combined coaxial high frequency and optical wave guide cable is inserted in the plug-in connector, the outer conductor is electrically contacted, for example, by four contact strips 39 at the contact area 38 of the tightening element 34. Thereby, the contact strips form approximately a circle and exert a spring force toward the inside, so that they fit closely against the circumference of the outer conductor. On their end proximate the pin 19, the distortion of the contact strips 39 and their position in the radial direction respectively is limited by the circumference of a circular intermediate element 40. With its front 41 distal the pin 19 the intermediate element 40 serves as an axial stop for a preformed shoulder in the cable. The intermediate element 40 fits closely against the front 42 of the contact strips 39 proximate to the socket 23, i. e, near to the thread 32. The outer conductor is electrically connected to the second contact element 28 via the contact strips 39 of the tightening element 34, the collet 31, the thread 32 and the socket 23.

A plug-in sleeve 43 is slid on with its first cylindrical partition 44 over the circumference of the pin 19 proximate the contact latches 20. The plug-in sleeve 43 contacts the dielectric insulator 25 between the pin 19 and the socket 23 with the circular radial partition 45 proximate the outside intermediate element 40 and extending from the first cylindrical partition 44 to the outside. The circumference of a second cylindrical partition 46, extending from the radial partition 45 in the radial direction in the direction to the second contact element 28, of the plug-in sleeve 43 fits closely to the wall of a cylindrical partition 24 of the socket 23. The partition 46 extends in the axial direction, proximate to the contact element 28, to a stop 47 on the cylindrical partition 24.

A continuous passageway 48 for the inner conductor of the combined coaxial high frequency/optical wave guide is provided in the plug-in connector 16. The passageway 48 extends from the end of the cylindrical joint 21 of the pin 19 distal the tightening means 33 to the outside of the connector 16. The passageway 48 extends obliquely to the longitudinal axis 18 of the plug-in connector 16 to the outside in the direction of the contact elements 22 and 28 through the pin 19, the dielectric insulator 25 and the wall of the socket 23. The passageway 48 serves to feed at least one optical wave guide element out of the plug-in connector 16. As a result, the combined cable of the present invention may be readily assembled to use. Preferably, the wall of the passageway 48 in the area of the pin 19 and the socket 23 is plastic coated. Consequently, an electrical short-circuit between the pin 19 and the socket 23 is prevented even if the optical wave guides are placed in a small metallic tube in the tubular inner conductor of the cable.

Although the present invention has been described herein with respect to one or more specific embodiment, it will be understood that other arrangements or configurations may also be implemented that do not depart from the spirit and scope hereof. Hence, the present invention is deemed limited only by the claims appended hereto and the reasonable interpretation thereof.

What is claimed is:

1. A coaxial high frequency cable; comprising:
   a tubular metallic inner conductor;
   a tubular metallic outer conductor, said tubular metallic inner conductor and said tubular metallic outer conductor being fixed in their spatial position by means of a dielectric, said tubular metallic inner conductor, said tubular metallic outer conductor and said dielectric therebetween constituting an electrical coaxial high frequency cable, said tubular metallic outer conductor including openings placed along a length of said cable for radiating electromagnetic energy; and
   at least on optical fiber element disposed within said tubular metallic inner conductor.

2. The coaxial high frequency cable as claimed in claim 1, wherein said optical fiber is a part of said optical element extending along the length of said inner conductor.

3. The coaxial high frequency cable as claimed in claim 2, wherein said optical elements are cores.

4. The coaxial high frequency cable as claimed in claim 2, wherein said optical elements are ribbons.

5. The coaxial high frequency cable as claimed in claim 1 wherein said tubular inner conductor is formed by a metallic jacket tube of said optical wave guide element.

6. The coaxial high frequency cable as claimed in claim 5, wherein said jacket tube includes a plurality of optical fibers having an excess length greater than 0.5%.

7. The coaxial high frequency cable as claimed in claim 5, wherein the diameter of said jacket tube is less than 2 mm.

8. The coaxial high frequency cable as claimed in claim 1, wherein said the tubular inner conductor is made from a longitudinal welded metal strip.

9. The coaxial high frequency cable as claimed in claim 1 wherein said tubular inner conductor is corrugated.

10. A ready-to-use high frequency cable having a tubular inner conductor, a tubular outer conductor having openings placed along a length of said cable for radiating electromagnetic energy, and an optical fiber element disposed within said tubular inner conductor, including a plug-in connector disposed at one end of said cable, said plug-in connector including a passageway for feeding out said optical fiber element, said passageway extending from an axial pin in a direction oblique to the longitudinal axis of said plug-in connector to the outside surface thereof.

11. The high frequency cable as claimed in claim 10, wherein said passageway passes through said pin and a socket, said socket being concentric with said pin.

12. The high frequency cable as claimed in claim 10, wherein the circular space between said pin and a socket is filled with a dielectric material and said passageway passes through said dielectric material.

13. A plug-in connector as claimed in claims 10, wherein said pin and a socket are plastic-coated in the area where they are passed through by said passageway.

* * * * *